United States Patent [19]
Lammers et al.

[11] 3,915,437
[45] Oct. 28, 1975

[54] MIXING APPARATUS

[75] Inventors: Peter C. Lammers, Lancaster; John R. White, Wadsworth, both of Ohio

[73] Assignee: The Goodyear Tire & Rubber Company, Akron, Ohio

[22] Filed: Jan. 10, 1975

[21] Appl. No.: 540,055

[52] U.S. Cl. ................................................ 259/4
[51] Int. Cl.² .................... B01F 15/02; B01F 15/04
[58] Field of Search ............ 259/4, 5, 6, 7, 8, 9, 10, 259/18, 21, 22, 23, 24, 40, 41, 42, 43, 44, 95, 66, 67; 23/252 R; 222/135, 129

[56] References Cited
UNITED STATES PATENTS

| | | | |
|---|---|---|---|
| 2,847,196 | 8/1958 | Franklin | 259/8 |
| 2,958,516 | 11/1960 | Wall | 259/8 |
| 3,207,486 | 9/1965 | Rosenthal | 259/8 |
| 3,265,365 | 8/1966 | Ward | 259/8 |
| 3,784,169 | 1/1974 | Keuerleber | 259/4 |
| 3,790,030 | 2/1974 | Ives | 222/135 |

*Primary Examiner*—Robert W. Jenkins
*Attorney, Agent, or Firm*—F. W. Brunner; J. D. Wolfe

[57] ABSTRACT

An apparatus for mixing materials of different viscosities to insure the mixtures are of the desired proportions, the apparatus including means for feeding viscous materials to a mixing head, means for recycling and means for obtaining a sample discharge at a fixed weight per unit of time, adjusting the valve means to obtain the pressure on the feed line obtained at the time the samples were drawn.

1 Claim, 1 Drawing Figure

U.S. Patent   Oct. 28, 1975   3,915,437
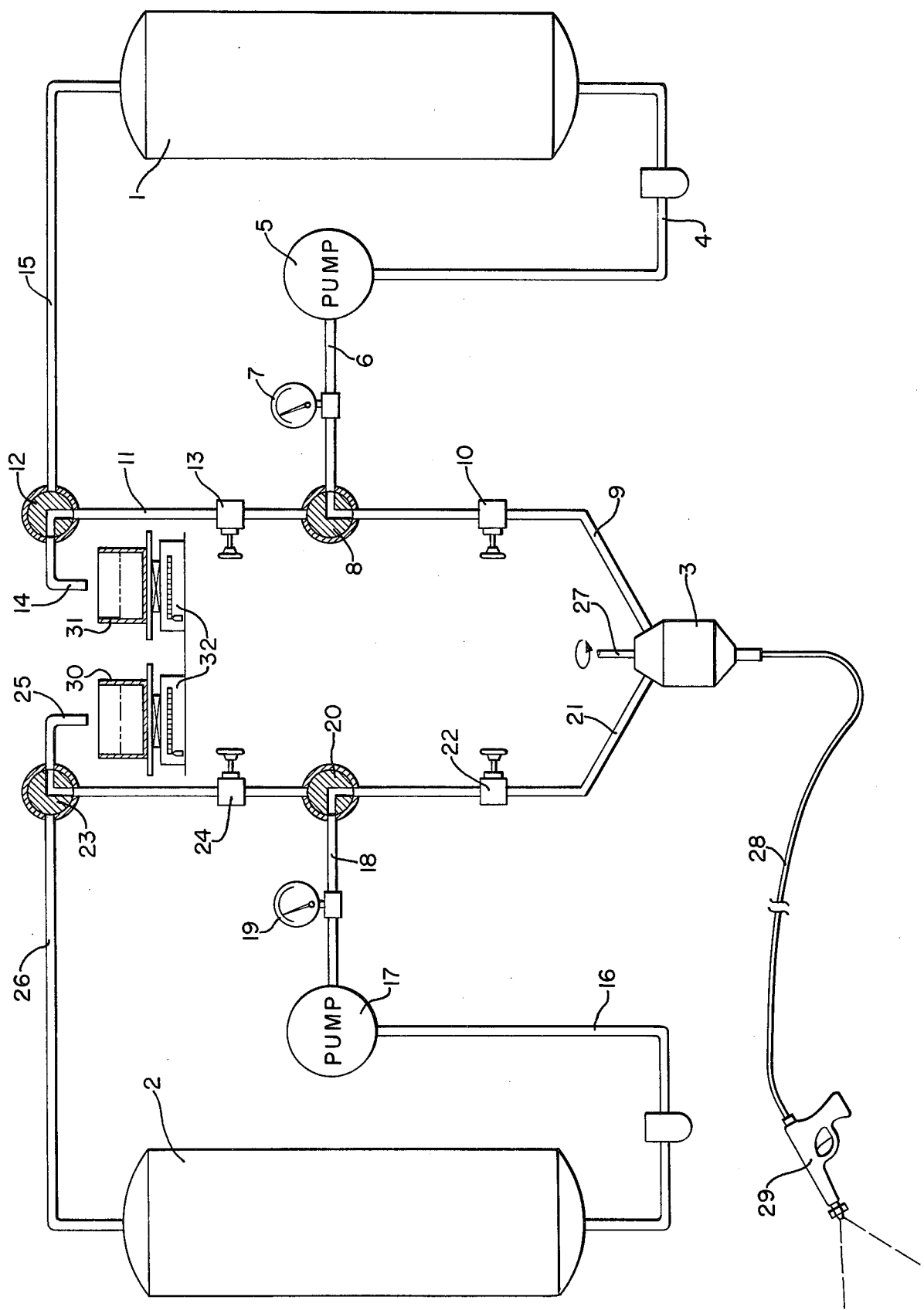

MIXING APPARATUS

This invention relates to an improved method of metering components to a mixing head. More particularly, this invention relates to an improved apparatus for metering materials of differrent viscosities to a mixing apparatus.

Regulating and controlling the feed of materials of greatly different viscosity to a mixing apparatus to obtain a reaction mixture of controlled amounts of each ingredient is difficult and more specifically, insuring the desired amount of each ingredient is extremely difficult and requires use of very elaborate equipment which is quite expensive.

Therefore, an object of this invention is to provide a method and apparatus for easily and economically mixing precise amounts of ingredients having varying viscosities and subsequently delivering the mixture to the desired place.

The nature of this invention and its many advantages can be more readily appreciated by reference to the schematic drawing of the mixing apparatus wherein numerals 1 and 2 of the drawing represent storage vessels for the ingredients of different viscosities to be charged to the mixing head 3 to produce the desired mixture.

Where a liquid polyurethane reaction mixture is to be produced, vessel 1 would contain the low viscosity curative such as a polyamine or polyol which usually will have a viscosity of less than 100 centipoises at 20°C. On the other hand, vessel 2 would hold the more viscous prepolymer formed by reacting an excess of an organic polyisocyanate with a polyester or polyether polyol. These prepolymers can have viscosities of less than 5,000 to 50,000 centipoises at 28°C. and consequently, demonstrates substantailly viscosity difference that can be experienced in materials fed the mixer.

Referring again to the drawings, it will be noted that vessel 1 has a pipe 4 between it and the feed pump 5. Feed pump 5 can be of any of the conventional types such as piston or rotary pumps. The pump 5 moves or feeds material from vessel 1 via line 6 to T-valve 8 with the pressure gauge 7 in line 6 registering the pressure developed in the line by the pump. T-valve 8 can be turned to allow material from vessel 1 to be fed to the mixing head 3 via line 9 which contains a needle valve 10.

When T-valve 8 is turned to the by-pass position, material no longer flows to the mixing head but flows past needle valve 13 via line 11 to sample T-valve 12. Sample T-valve 12 can be turned to let material recycle to vessel 1 via recycle line 15. Alternately, sample T-valve 12 can be turned to discharge material from vessel 1 into sample receiver 31 resting on scales 32 beneath open line 14.

When a sample is being collected in vessel 31, the amount of sample collected in a unit time can be controlled by adjusting needle valve 13. Adjustment of needle valve 13 will accordingly change the pressure reading on pressure gauge 7. For instance, where it is desired to feed 10 parts of amine curative per minute to the spray head, then the needle valve 13 would be adjusted to collect the sample at the rate of 10 parts per minute at the pressure shown on gauge 7. The pressure developed on the pressure gauge at the time the sample is being collected at the desired rate will sometimes be referred to as the desired or operational pressure.

It should be noted that the left hand side of the drawing shows the piping arrangement between the mixing head 3 and vessel 2. The description of the left hand side of the drawing would be identical to the right hand side except the numbers for the respective parts on the left hand side would be as shown in the drawing for numbers 16 to 26.

The mixing head 3 has a motor (not shown) driven stirrer 27 and a hose 28 connecting the mixing head with a hand operated spray gun 29 which can be manipulated to apply the desired thickness of liquid to the surface to be coated.

In operation, vessels 1 and 2 are charged with ingredients to be mixed, for example, as indicated above a polyurethane prepolymer of a 4,4'-di(isocyanato cyclohexyl) methane and polypropylene/ethylene adipate of 1800 molecular weight having an NCO value of 0.95 dissolved in 30 parts of methyl ethyl ketone for each 100 parts of prepolymer is placed in vessel 1 and a solution of isophorone diamine in methyl ethyl ketone is placed in vessel 2.

In one mode of operation T-valves 20 and 23 and T-valves 8 and 12 respectively, are turned to give fluid connection between the pumps and the return or recycle lines 26 and 15 and thereby permit material to be returned to vessels 1 and 2. The pumps 5 and 17 are started by activation of the pump motors (not shown). Then T-valves 12 and 13 are turned to pump material into sample collecting vessels 31 and 30 by pipes 14 and 25. The amount of each material collected individually in a unit time in the individual sample vessels 30 and 31 is determined by weighing or measuring, for instance, on scales 32, and needle valves 13 and 24 are adjusted to give the desired ratio of discharge of material from vessels 1 and 2 into vessels 30 and 31 respectively.

It readily should be understood and appreciated that the amount of material collected in sample vessels 30 and 31 will be adjusted to give the desired amount of reactions in the final liquid polyurethane reaction mixture to develop the desired physical properties in the cured polyurethane. For instance, the prepolymer containing excess NCO can be charged to the mixer at a wide ratio relative to the curative. Normally, the ratio will be 0.5 to 1.2 equivalents of curative for each equivalent of excess NCO, with the preferred equivalents being 0.8 to .95 on each equivalent fo excess NCO.

When the desired ratio of discharge of materials is achieved, as shown by the sample collected, the pressure on gauges 7 and 19 are noted and hence is the desired or operating pressure for respective materials being pumped to the mixing head. Then T-valves 8 and 20 are turned to stop the recycle of material and to feed material to the mixing head 3. Since the stirrer 27 is operating, the material fed to the mixing head is mixed and discharged from the spray gun 27 on actuation thereof. If the pressure on gauges 7 and 19 are not the same as the desire or operating pressure, then needle valves 10 and 22 are operated to cause pressure gauges 7 and 19 to record the desired or operating pressures and thereby insure the mixture leaving the spray gun has the desired ratio of ingredients from vessels 1 and 2. For instance, the ratio of prepolymer to curative can be adjusted to develop the desired physical properties in the cured polyurethane.

Although the operation of this apparatus has been described as being operated with a prepolymer and a curative, it could be operated as a one-shot apparatus with two or more components being fed to the mixer by individual feed and recycle means.

Also, the apparatus is shown equipped with a spray gun, but it could be operated with only hose 28 to charge molds or related mixture receiving means.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus capable of mixing materials of substantially different viscosities with high assurance the desired ratio of materials is obtained in the mixture, and distributing the mixture to the desired place, comprising means for feeding each material individually from its storage means to a common mixing means; and valve means to recycle each material individually to its individual storage means by its individual fluid transfer means; each of said fluid transfer means including a pressure gauge, a sample collection means and a needle valve to control the rate of each sample collection; a needle valve in each individual means for feeding each material to the common mixing means which can be adjusted to control pressure on the pressure means to corresponding pressure on the pressure means at the time each sample was collected a means to distribute the mixture to the desired place.

* * * * *

UNITED STATES PATENT OFFICE
CERTIFICATE OF CORRECTION

PATENT NO. : 3,915,437
DATED : October 28, 1975
INVENTOR(S) : Peter C. Lammers and John R. White It is certified that error appears in the above-identified patent and that said Letters Patent are hereby corrected as shown below:

Column 1, line 36, change "substantailly" to -- substantial --.

Column 2, line 47, change "fo" to --of--; and

Column 4, line 14, insert --and-- after "collected".

Signed and Sealed this

Twentieth Day of July 1976

[SEAL]

Attest:

RUTH C. MASON
Attesting Officer

C. MARSHALL DANN
Commissioner of Patents and Trademarks